R. E. NOBLE.
BRAKE FOR CARS OR LOCOMOTIVES.
APPLICATION FILED JUNE 23, 1913.

1,107,178.

Patented Aug. 11, 1914.
3 SHEETS—SHEET 1.

R. E. NOBLE.
BRAKE FOR CARS OR LOCOMOTIVES.
APPLICATION FILED JUNE 23, 1913.

1,107,178.

Patented Aug. 11, 1914.
3 SHEETS—SHEET 3.

Witnesses:
R. L. Farrington
Irma Forrest

Inventor
Ralph E. Noble,
By Glenn S. Noble
Atty.

UNITED STATES PATENT OFFICE.

RALPH E. NOBLE, OF CHICAGO, ILLINOIS, ASSIGNOR TO MORGAN-GARDNER ELECTRIC COMPANY, OF CHICAGO, ILLINOIS.

BRAKE FOR CARS OR LOCOMOTIVES.

1,107,178.  Specification of Letters Patent.  Patented Aug. 11, 1914.

Application filed June 23, 1913. Serial No. 775,311.

*To all whom it may concern:*

Be it known that I, RALPH E. NOBLE, a citizen of the United States, residing at Chicago, in the county of Cook and State of Illinois, have invented certain new and useful Improvements in Brakes for Cars or Locomotives, of which the following is a specification.

While this invention is more or less adapted for general uses, it is particularly applicable to locomotives such as are commonly used for haulage in mines or other similar uses. These locomotives are usually of high power and must be built low and compact and should be provided with quick acting powerful brakes.

The present invention has for its principal object to provide a lever operated brake apparatus which will be sufficiently small and compact so that it may be conveniently located in the limited space at the end of a locomotive, and which will be quick operating as well as being adapted to exert a powerful pressure on the brake shoes.

Other objects and advantages of this invention will appear more fully in the following specification.

Figure 1:
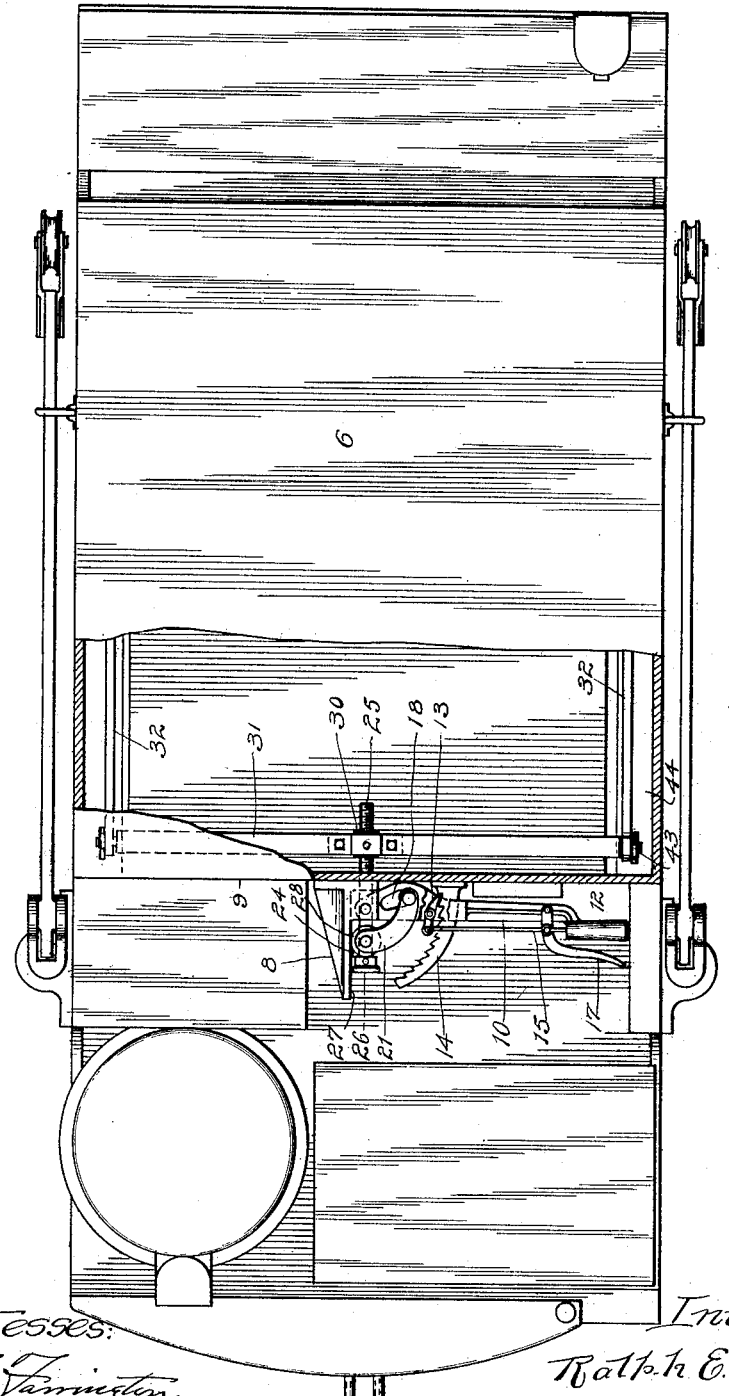
Figure 2:
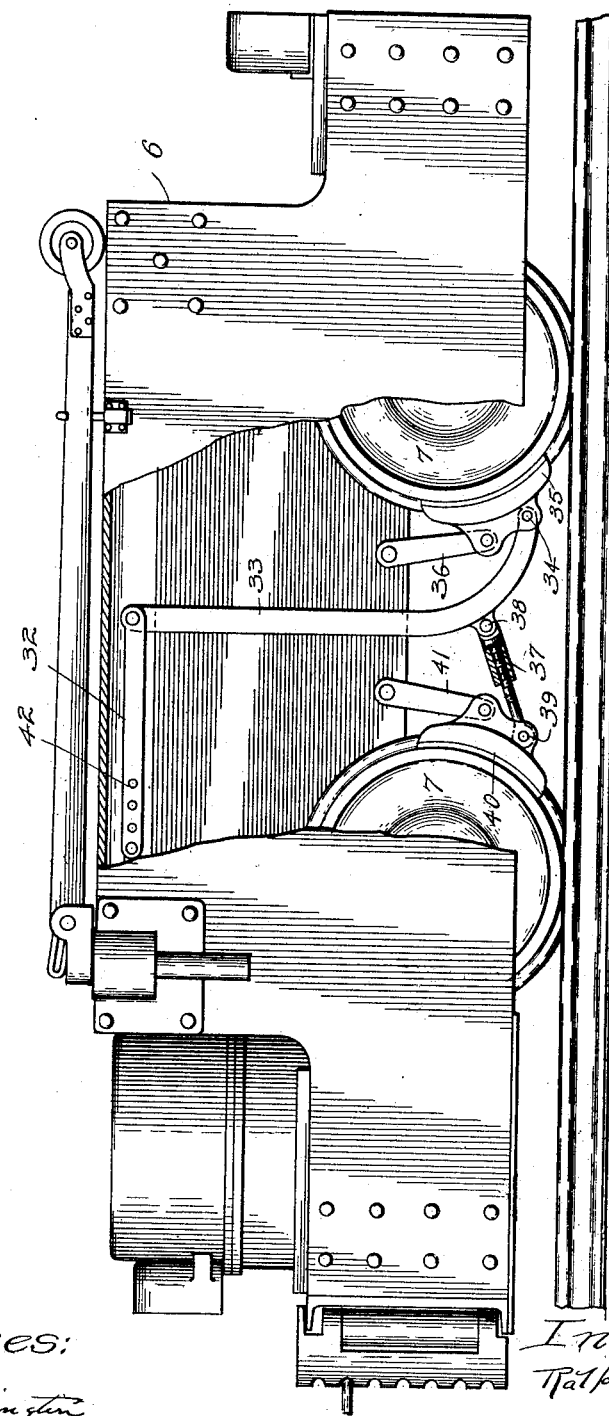
Figure 4:
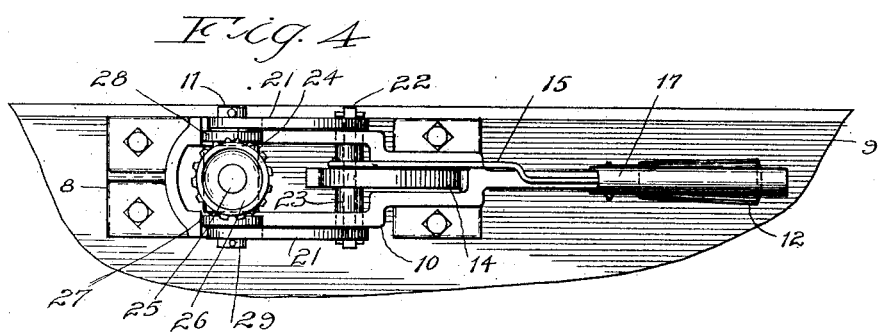
Figure 5:
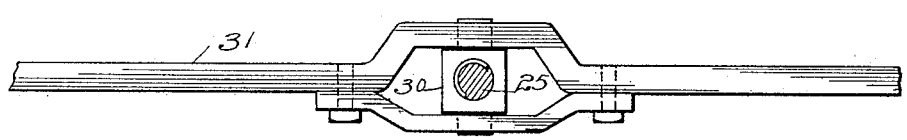

In the accompanying drawings illustrating this invention; Figure 1 is a top view of a locomotive provided with my improved brake apparatus, parts being broken away and other parts being shown diagrammatically; Fig. 2 is a side view of the locomotive, parts also being broken away or shown diagrammatically; and Figs. 3, 4, and 5 are details of the operating lever and adjacent connecting parts.

My improved brake apparatus is shown in connection with a locomotive 6, which is provided with wheels 7. A bracket 8 is attached to the front plate 9 or other suitable portion of the body of the locomotive, preferably adjacent to the driver's seat. A forked lever 10 is pivoted at 11 to the bracket 8 and has a handle 12 at its outer or free end. This lever is provided with a pawl 13 which co-acts with a curved rack or ratchet member 14, also secured to the end plate 9. The pawl 13 is held in engaging position by means of a rod 15 and spring 16, but may be released by means of a handle 17 pivoted to the lever 10, and also pivoted to the rod 15. The lever 10 is provided adjacent to its inner or pivoted end with a slot 18, which is preferably curved on one side as indicated at 19, which side for convenience may be termed the outer side. The other side of the slot as indicated at 20 is substantially straight. Two toggle arms 21 are connected at one end by means of a pin 22 which passes through the slot 18 and is provided with an anti-friction roller 23. The other end of the arms 21 are pivoted to a yoke or block 24 which has a rod or shaft 25 passing therethrough. This rod is shouldered to prevent the yoke from moving longitudinally thereof in one direction, and is provided at its outer end with a knob 26 which is fixed to the reduced end of the rod and serves as a collar to prevent the movement of the yoke 24 longitudinally of the rod in the other direction. The outwardly extending portion of the bracket 8 is provided with faces 27 along which run wheels or rollers 28 on the pivots or pins 29 of the yoke 24. The rod or shaft 25 serves to transmit the power from the lever or toggle apparatus to the brake shoes and may be connected therewith in various ways. In the present instance this rod is threaded at its inner end, which end engages with a nut 30, which nut is pivotally mounted in a cross bar 31, as clearly shown in Fig. 5. The outer ends of the bar 31 are connected by means of bars 32 to the upper ends of levers 33. The lower ends of these levers are pivoted at 34 to the lower portions of brake shoes 35. These shoes are supported on links 36 from any convenient portion of the locomotive frame. Adjustable arms 37 are pivoted at 38 to the levers 33 and are pivoted at 39 to the lower portions of coacting brake shoes 40, these brake shoes being supported by links 41 in a similar manner to the shoes 35. The bars 32 are provided with a plurality of holes 42 for the end of the bar 31 in order to provide for more or less coarse adjustment, and the ends of the bar 31 are provided with rollers 43 which run upon flanges or runways 44 to assist in supporting the bar 31 and preventing binding.

Figure 3:
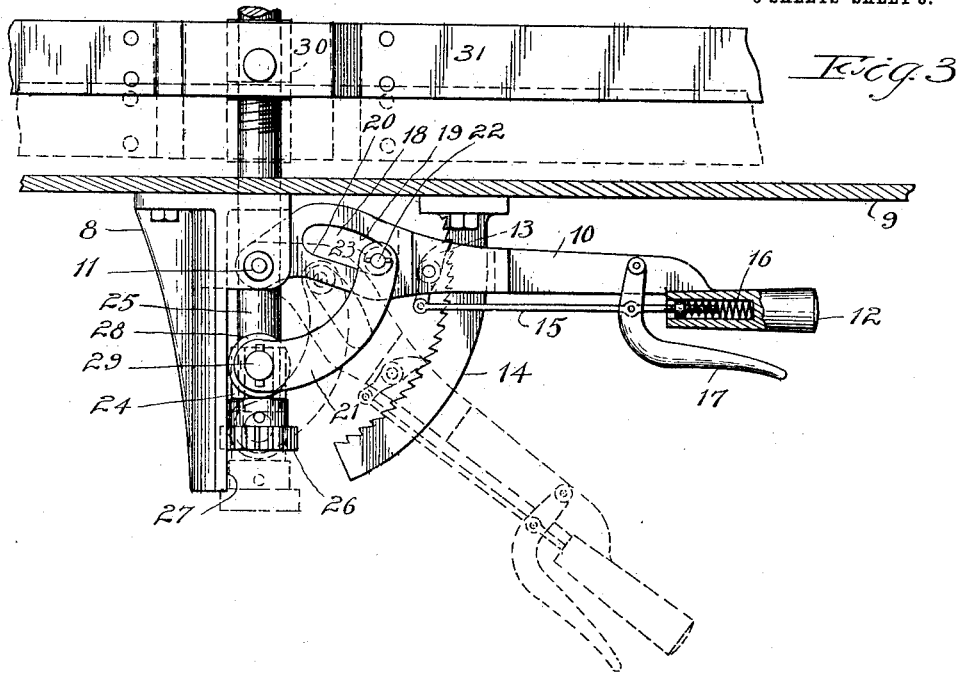

The operation of the principal novel features of this invention will be best understood in connection with Fig. 3. The slot 18 is so shaped and located in the lever 10 that when the lever is first moved from off position as shown in full lines, the roller 23 remains at the outer end of the slot for a predetermined length of time, thereby causing a comparatively rapid outward longitudinal movement of the rod or screw 25. Then, toward the latter end of the throw of the lever 10, the roller 23 moves inwardly toward the inner end of the slot, thereby decreasing the relative movement of the rod 25, but increasing the leverage so that the rod is forced outward under the toggle action with an exceedingly great force. The rollers 28 running upon the faces 27 prevent any lateral movement of the rod 25 as well as reducing the friction between the parts. It will be noted that, as the operator pulls on the handle 12, the pawl 13 will serve to lock the brakes and he does not need to manipulate the lever 17. When the brakes are to be released the operator pushes on the handle 17 which releases the pawl 13 and as this handle closes against the handle 12, the lever 10 is pushed back to initial position. During this movement the roller 23 quickly rolls out along the relatively flat side of the slot 18 so as to give a quick releasing action to the brakes. It will be readily observed that the movement of the rod or screw 25 is transmitted through the nut 30 to the equalizer bar 31 and from thence through the bars 32, levers 33 and arms 37 to the brakes. Adjustment of the brakes is provided through the adjustable arms 37, the various holes 42 in the bars 32 and also by means of the rod or screw 25. By turning the knob 26 this screw may be tightened or loosened so as to quickly take up a limited amount of loose motion due to wear or the like without the necessity of adjusting the other parts. It will be readily observed that my improved operating lever with the variable motion toggle arrangement may be applied in various ways to meet different conditions, and I do not wish to limit myself to the exact construction or arrangement set forth herein, except as pointed out in the appended claims, in which—

I claim:

1. The combination with a rod for operating brake levers, of a toggle arm having one end pivotally connected therewith, a second toggle arm pivoted adjacent to said rod and having a handle at its free end and being provided with a slot adjacent to its pivoted end, the outer side of said slot being curved, and the inner side being substantially straight, and means at the other end of the first-named toggle arm for engagement with said slot, said slot and engaging means being arranged so that when the handle is moved to set the brakes, the engaging means will remain at the outer end of the slot during a predetermined movement of the handle, and will then move inwardly toward the inner end of the slot; and when the handle is moved to release the brakes, the engaging means will engage with the straight side of the slot, and will move out to the outer end of the slot during the first movement of the handle.

2. In a device of the character set forth, the combination with a power transmitting rod, of means for moving the rod longitudinally, comprising a toggle arm having one end pivotally in engagement with said rod, and having a roller at its opposite end, a second toggle arm having one end pivoted adjacent to said rod and having a handle at its free end and being provided with a slot adjacent to the pivoted end for receiving said roller, the arrangement being such that when the handle is moved in one direction, the roller will move to the outer end of the slot so that a relatively rapid movement will be given to the first-named toggle arm, and when the handle is moved in the opposite direction to apply power, the roller will remain at the outer end of the slot for a portion of the movement and will then roll to the inner end of the slot for the remaining portion of the movement.

3. The combination with a rod for transmitting power to brakes or the like, of a lever having one end pivoted adjacent to the rod and having a slot therein, one side thereof curved, and the other side substantially straight, and arranged at an acute angle to the lever adjacent to its pivoted end, a roller in said slot, an arm connected with said roller and having its opposite end pivotally engaged with said rod, and means for guiding said roller in its longitudinal movement.

4. In a brake apparatus for a locomotive or the like, the combination of a bracket, a lever pivoted to said bracket and having a slot adjacent to its pivoted end, means for holding said lever in adjusted position, a roller in said slot, a rod for operating brake levers, arms pivotally engaged with said roller and said rod, guide rollers on said rod engaging with the bracket, the arrangement being such that when the lever is moved the rod will be moved longitudinally by means of the arms with a variable motion.

5. The combination with the frame of a car or locomotive, a bracket, a forked lever pivoted to said bracket and having a handle at its free end, a screw passing through said bracket between the forked ends of the lever, a collar on said screw, arms pivotally connected between said collar and said lever, means for guiding said screw in its longitudinal movement, a handle at the outer end of said screw, a nut at the inner end of said screw, an equalizing bar connected with said nut, and means connecting between said bar and the brake shoes for operating the shoes.

6. The combination with the frame of a locomotive, of a bracket secured to one end thereof and having outwardly extending guide faces, a screw passing through said bracket, means for turning said screw, a collar on said screw for moving it longitudinally, rollers on said collar engaging with said guide faces, arms pivotally connected with said collar, a roller between the outer ends of said arms, a forked lever having its forked ends pivoted to said bracket at about the center of the screw and having slots for receiving said roller at the outer ends of said arms, said slots being curved on their outer sides and substantially straight on their inner sides and positioned so as to cause the roller to shift to change the relative movement of the arms during the travel of the lever, means for holding said lever in adjusted position, a threaded block engaging with said screw, an equalizer bar pivotally connected with said block, and means connecting between said bar, and the brake shoes for operating the shoes when the lever is moved.

7. The combination with a car or locomotive, of a bracket secured to one end thereof and having longitudinal guide faces, a screw passing through said bracket, means for turning said screw, a collar on said screw for moving it longitudinally, guide rollers on said collar engaging with said guide faces, arms pivoted to said collar, a roller between the outer ends of said arms, a handle lever pivoted to said bracket at about the center of the diameter of the screw, and having a slot for receiving said last-named roller, a rack adjacent to said lever, a pawl on said lever for engagement with said rack, a rod pivoted to said pawl, and extending into the handle of the lever, a spring in said handle for holding said rod to cause the pawl to engage with the rack, a handle pivoted to said lever and to said rod and arranged on the outer side of the lever handle so that the operator may press against the same when releasing the brakes, a block engaging with said screw, an equalizer beam pivotally secured to said block, bars connected with the ends of said beam, brake shoes for engagement with the wheels of the locomotive, links for supporting said shoes, levers connected with said bars and one of the shoes at either side of the locomotive, and arms connecting said last-named levers and the opposite shoe of a pair of shoes at either side of the locomotive, the arrangement being such that when the lever is moved in one direction the brakes may be set and held in locked position, and when the lever is moved in the opposite direction the brakes will be released.

RALPH E. NOBLE.

Witnesses:
F. C. LETZ,
M. O'HALLORAN.

Copies of this patent may be obtained for five cents each, by addressing the "Commissioner of Patents, Washington, D. C."